May 23, 1950  R. M. HEINTZ  2,508,641
MOTOR HOUSING AND SHOCK ABSORBING
MOUNTING MEANS THEREFOR

Filed Nov. 9, 1946 2 Sheets-Sheet 2

INVENTOR.
RALPH M. HEINTZ
BY
Frank H. Harmon
ATTORNEY

Patented May 23, 1950

2,508,641

UNITED STATES PATENT OFFICE 2,508,641

MOTOR HOUSING AND SHOCK ABSORBING MOUNTING MEANS THEREFOR

Ralph M. Heintz, Cleveland, Ohio, assignor to Jack & Heintz Precision Industries, Inc., Cleveland, Ohio, a corporation of Delaware Application November 9, 1946, Serial No. 709,071

6 Claims. (Cl. 248—26)

This invention relates in general to supports and more particularly to supports for motors or other rotating bodies.

One of the primary objects of the invention is to provide a yielding support for a motor housing that will effectively dampen vibrations set up by the rotating parts therein and prevent transmission of vibrations to the supporting structure so as to insure smooth and silent operation.

Another object is to provide vibration dampening means for the shaft bearing bosses of the housing which will permit gyratory movements of the housing so as to absorb radial torsional and axial vibrations.

A further object is to provide a shock absorbing support for a motor housing in which the housing with its extending motor shaft may be quickly secured in and removed from the support.

A further object is to provide a quick detachable cushioning pad assembly that is detachably secured to the outer faces of the two ends of the U-shaped motor support frame.

With the foregoing and other objects in view, the invention resides in the combination of parts and in the details of construction hereinafter set forth in the following specification and appended claims, certain embodiments thereof being illustrated in the accompanying drawings, in which:

Figure 5 is an end view of the shock absorbing pad; and

Figure 6 is a view in section taken along line 6—6 of Figure 5.

Figure 1:
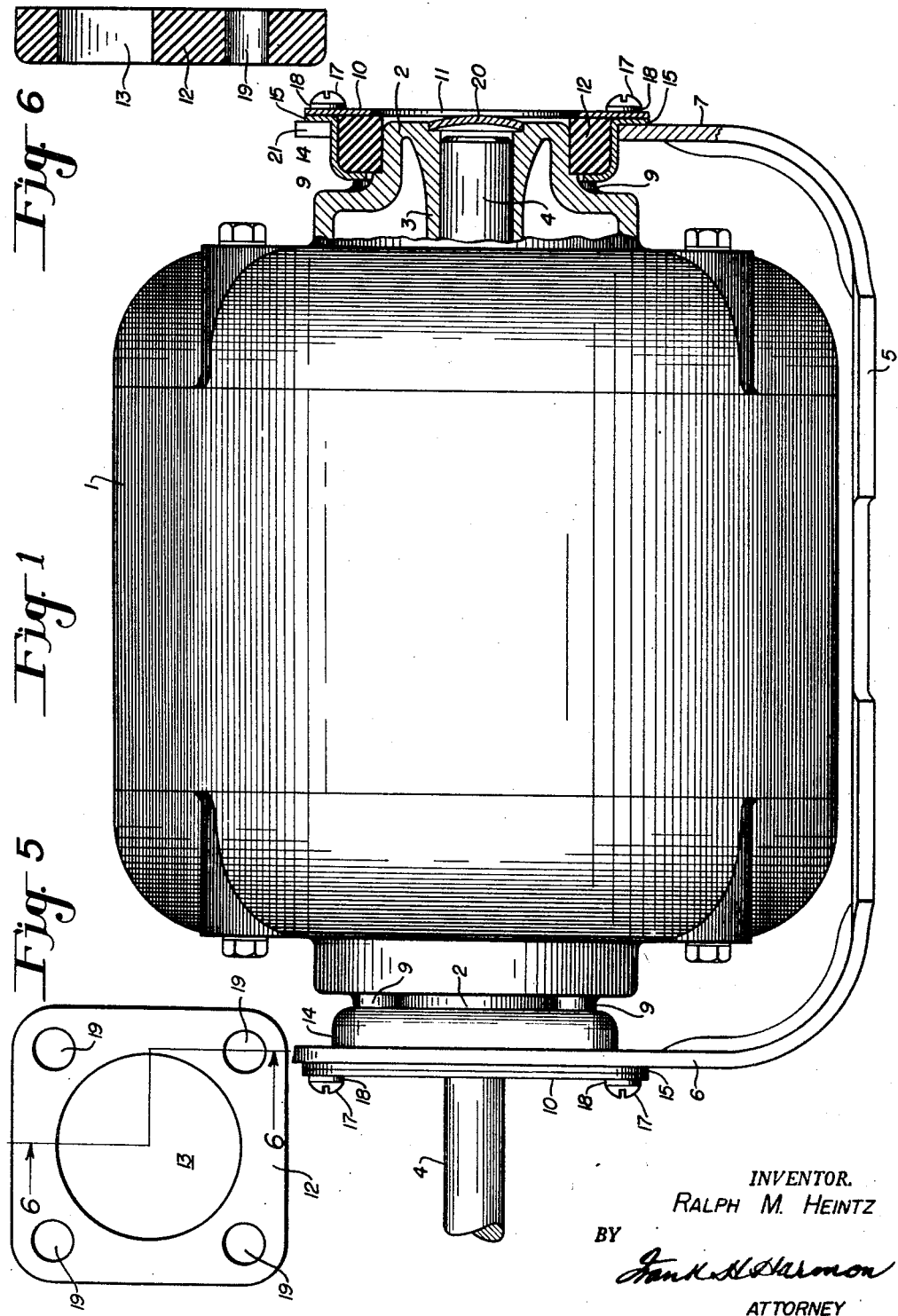
Figure 1 is a view in side elevation of the motor and its support; the support at one end being broken away and shown in section.
Figure 2:
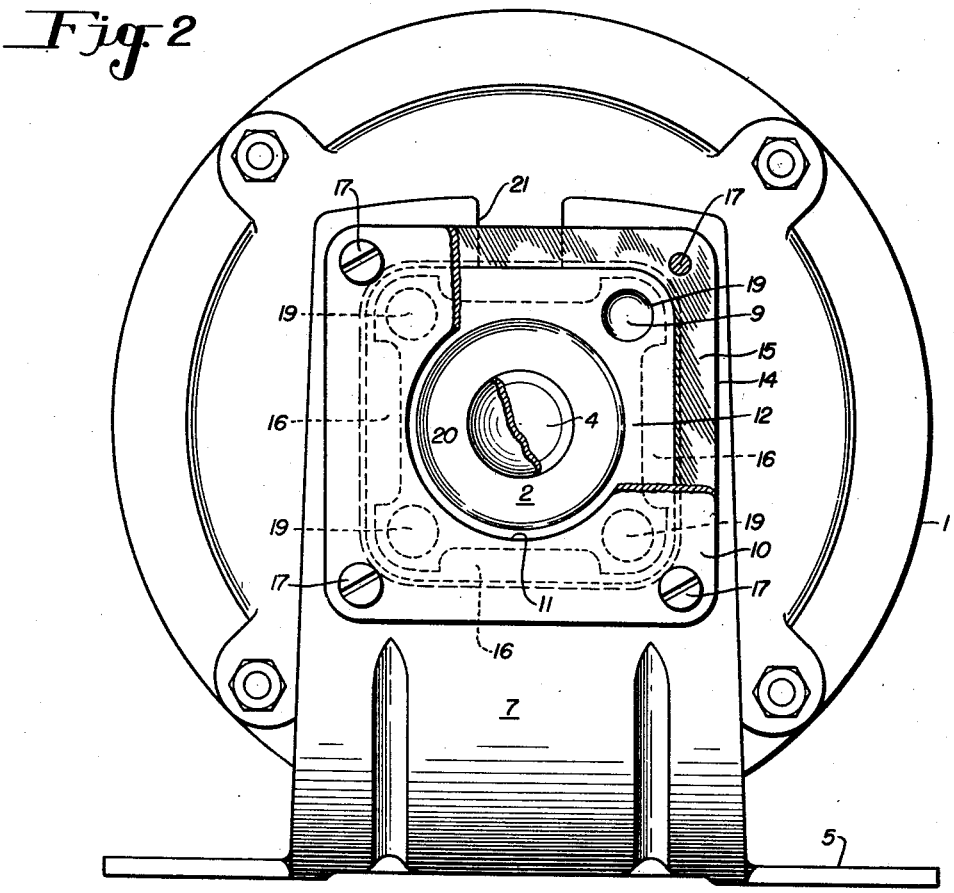
Figure 2 is a view in end elevation of a motor in the motor support embodying the present invention.
Figures 3, 4:
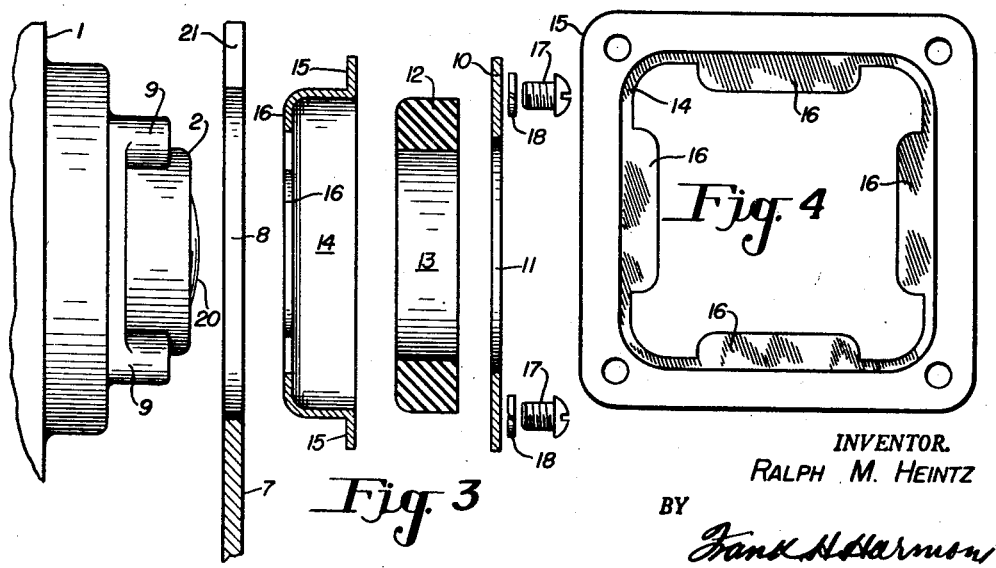
Figure 3 is an exploded view, showing one end of the motor housing in side elevation and the support frame and resilient mounting assembly component parts in longitudinal section.
Figure 4 is an inside end view of the detachable retainer for the shock absorbing pad.

Referring more particularly to the drawings, there is shown for an electric motor housing 1 with end bearing portions 2, a plurality of bosses 9 disposed axially of the housing and projecting from the ends thereof so as to provide bearing supports 3 for the electric motor armature shaft 4.

The motor housing support comprises a frame 5 of flat metallic material of U-shaped form to include standards 6 and 7, each of which has a square aperture 8 to receive detachable cushioning pad assemblies for resiliently supporting the motor housing.

At 10 is shown a flat plate with a circular aperture 11 to which plate is suitably bonded a rubber pad 12 with a circular opening 13 in registry with but of slightly less diameter than that of aperture 11. The pad 12 is then inserted in a cup 14 having outer flanges 15 and inwardly extending retaining flanges 16 against which the inside face of the pad 12 rests. The square faced cup 14, with the pad 12 therein and the bonded plate 10, is then inserted through the square aperture 8 so as to extend inwardly of each standard 6 and 7 with flange 15 abutting the exterior surface of the standard and plate 10 abutting the exterior surface of flange 15. The standard, flange 15 and plate 10 have aligned bolt holes to receive screw bolts 17 with washers 18 to detachably secure the pad assemblies in place on the standards, the screw bolts being applied and removed from the outside of the standards.

The pads 12, besides having central circular openings 13 to receive the end bearing portions 2 of the motor housing, also have four apertures 19, one in each corner of its square cross sectional forms, each of which apertures 19 receives a corresponding axially extending boss 9 of the motor housing.

The particular showing includes a mount in which only one end of the armature shaft extends through its mount, in which case a spring seal 20 may be employed, as shown in Figure 1. In such a case the motor housing may be installed in the shock absorbing support assemblies in the mounting frame without the necessity for slotting either of the upper ends of the standards. Where the motor construction is such that the armature shaft extends through both ends of the motor housing, one of such standards may be provided with a slot 21 through which the armature shaft may be lowered when the bearing bosses are to be inserted in the shock absorbing pads of the resilient mounting support.

The torsional thrust transmitted by the motor armature through the motor housing is cushioned by the rubber shock absorbing pads 12 by reason of the engagement of the housing bosses 9 in the corner apertures 19 of the pads 12 and due to the fact that the square pads 12 are enclosed in the square cups 14 secured to the mounting frame standards. In other words, the bosses 9 transmit torsional thrusts to the rubber pads which yieldingly resist turning movements of the housing. Each rubber pad is held against turning movements by reason of its square shape in the square cups 14 and only the slight turning movements permitted by the elasticity of the rubber itself can be imparted to the housing. The torsional vibrations set up in the motor are effectively dampened by the cushioning pads and are not transmitted to the supporting frame 5 or its standards 6 and 7.

Moreover, due to the fact that the diameter of the central circular opening 13 of the rubber pad 12 is less than the opening 11 of plate 10, all movements of the motor housing transverse to its axis are also limited any vibrations in a lateral direction are effectively dampened. These rubber pads permit the housing to have slight endwise movements and slight angular movements about its own axis or one transverse thereto so that the necessity for accurate alignment is lessened. The fact that the rubber pads permit slight gyratory movements materially lessens the wear on the armature shaft bearings.

The motor housing is yieldably supported by the cushioning pads and is permitted to have gyratory movements and vibratory movements in any direction but since these movements do not transmit vibrations to the motor supporting frame, the operation of the motor is smooth and silent. Moreover, the construction of the support is simple and lends itself to quick assembly and quick detachability from the outside of the standards of the supporting frame.

I claim:

1. A motor housing and a support therefor, said housing having cylindrical end bearing portions and bosses extending axially about said bearing portions, mounting frame with two spaced end supporting standards provided with openings, a resilient shock absorber assembly secured to the outside faces of each standard to extend inwardly through the openings in each standard, said shock absorber assemblies each including pad of resilient material having a central opening to receive and support said motor housing end bearing portions resiliently against transverse movements said rubber pads also having openings to receive said motor housing bosses to support said housing resiliently against gyratory movements.

2. A motor housing and a support therefor, said housing having cylindrical end bearing portions and cylindrical bosses extending axially about said bearing portions, mounting frame with two spaced end supporting standards provided with openings, a resilient shock absorber assembly detachably secured to the outside faces of each standard to extend inwardly through the openings in each standard, said shock absorber assemblies each including a pad of resilient material having a central opening to receive and support said motor housing end bearing portions resiliently against transverse movements, said rubber pads also having openings to receive said axially motor housing bosses to support said housing resiliently against gyratory movements.

3. A motor housing and a support therefor, said housing having cylindrical end bearing portions and cylindrical bosses extending axially about said bearing portions, a mounting frame with two spaced end supporting standards provided with openings, a resilient shock absorber assembly detachably secured to the outside faces of each standard to extend inwardly through the openings in each standard, said shock absorber assemblies each including a pad of resilient material, attachment plates bonded to said pads, said pads each having a central circular opening of less diameter than that of said attachment plates to receive and support said motor housing end bearing portions resiliently against transverse movements, said rubber pads also having a plurality of openings each to receive a corresponding one of said axially extending motor housing bosses to support the same resiliently against gyratory movements.

4. A motor housing and a support therefor, said housing having cylindrical end bearing portions and cylindrical bosses extending axially about said bearing portions, mounting frame with two spaced end supporting standards each of which is provided with a central opening, a resilient shock absorber assembly detachably secured to the outside faces of each standard to extend inwardly through the openings in each standard, said shock absorber assemblies each including a pad of resilient material, an attachment plate bonded to said pad, a cup to receive said pad, said pad having a central circular opening of less diameter than that of said attachment plate to receive and support said motor housing end bearing portions resiliently against transverse movements, said pads also having a plurality of openings each to receive a corresponding one of said axially extending motor housing bosses to support the same resiliently against gyratory movements.

5. A motor housing and a support therefor, said housing having cylindrical end bearing portions and cylindrical bosses extending axially about said bearing portions, a U-shaped mounting frame with two spaced end supporting standards each of which is provided with a central polygonal opening, a resilient shock absorber assembly detachably secured to the outside faces of each standard to extend inwardly through the openings in each standard, said shock absorber assemblies each including a polygonal pad of resilient material, an attachment plate bonded to said pad, a cup to receive said pad, said pad having a central circular opening of less diameter than that of said attachment plate to receive and support said motor housing end bearing portions resiliently against transverse movements, said pads also having a plurality of openings located in the corners of its polygonal form each to receive a corresponding one of said axially extending motor housing bosses to support the same resiliently against gyratory movements.

6. A motor housing and a support therefor, said housing having cylindrical end bearing portions and cylindrical bosses extending axially about said bearing portions, a U-shaped mounting frame with two spaced end supporting standards each of which is provided with a central polygonal opening, a resilient shock absorber assembly detachably secured to the outside faces of each standard to extend inwardly through the openings in each standard, an attachment plate, said shock absorber assemblies each including a polygonal rubber pad bonded to said outer attachment plate with a central opening and received by a cup with inner retaining flanges, said pad having a central circular opening of less diameter than that of said attachment plate to receive and support said motor housing end bearing portions resiliently against transverse movements, said rubber pads also having a plurality of openings located in the corners of its polygonal form each to receive a corresponding one of said axially extending motor housing bosses to support the same resiliently against gyratory movements of said motor housing.

RALPH M. HEINTZ.

REFERENCES CITED

The following references are of record in the file of this patent:

UNITED STATES PATENTS

| Number | Name | Date |
|---|---|---|
| 2,096,139 | Spahr | Oct. 19, 1937 |
| 2,113,020 | Geyer | Apr. 5, 1938 |
| 2,115,569 | Brown | Apr. 26, 1938 |
| 2,185,375 | Janca | Jan. 2, 1940 |
| 2,209,477 | Reibel | July 30, 1940 |